United States Patent
Relan et al.

(10) Patent No.: US 6,553,643 B2
(45) Date of Patent: Apr. 29, 2003

(54) METHOD OF LOADING A CLUTCH PACK INTO A CLUTCH DRUM

(75) Inventors: Krishna K. Relan, Canton, MI (US); Sungchin Hong, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 93 days.

(21) Appl. No.: 09/840,680

(22) Filed: Apr. 23, 2001

(65) Prior Publication Data

US 2002/0152602 A1 Oct. 24, 2002

(51) Int. Cl.$^7$ ................................................. B23Q 3/00
(52) U.S. Cl. ............................... 29/464; 29/467; 29/468
(58) Field of Search ............................. 29/274, 281.5, 29/464, 467, 468; 192/70.2, 70.21, 87.11

(56) References Cited

U.S. PATENT DOCUMENTS

| | | | | |
|---|---|---|---|---|
| 1,941,022 A | * | 12/1933 | Shelley | 29/274 |
| 1,986,156 A | * | 1/1935 | Nelson | 29/274 |
| 1,995,738 A | * | 3/1935 | Fish | 29/244 |
| 2,046,774 A | * | 7/1936 | Oertel | 29/274 |
| 2,067,442 A | * | 1/1937 | Frisz | 192/30 R |
| 2,487,504 A | * | 11/1949 | Yelkin | 279/3 |
| 3,488,830 A | * | 1/1970 | Miller | 219/160 |
| 3,686,739 A | * | 8/1972 | Manero | 269/1 |
| 4,231,147 A | * | 11/1980 | Witt | 251/209 |
| 4,254,541 A | * | 3/1981 | St. John | 192/107 T |
| 4,255,839 A | * | 3/1981 | Shea | 29/274 |
| 4,564,994 A | * | 1/1986 | Marx | 269/47 |
| 4,640,294 A | | 2/1987 | Ordo | 192/70.2 |
| 4,727,770 A | | 3/1988 | Ordo | 74/785 |
| 4,910,856 A | * | 3/1990 | Watanabe | 29/241 |
| 4,916,792 A | * | 4/1990 | Haubus | 269/48.1 |
| 5,042,135 A | * | 8/1991 | Kroninger et al. | 29/274 |
| 5,054,186 A | * | 10/1991 | Weselak | 192/70.11 |
| 5,104,162 A | * | 4/1992 | Watanabe | 29/274 |
| 5,295,291 A | * | 3/1994 | Harris | 29/274 |
| 5,718,043 A | * | 2/1998 | Pearson | 29/889.5 |
| 5,794,339 A | * | 8/1998 | Pearson et al. | 29/889.5 |

* cited by examiner

Primary Examiner—Gregory M. Vidovich
Assistant Examiner—Essama Omgba
(74) Attorney, Agent, or Firm—Leslie C. Hodges

(57) ABSTRACT

A method of loading a clutch pack into a clutch drum. The clutch pack includes a plurality of friction plates between a plurality of reaction plates. Each reaction plate has a plurality of outside spline teeth slidably received in a corresponding plurality of straight spline grooves in a cylindrical wall of the drum. The method of loading the clutch pack into the drum includes the steps of forming annular seat on an outboard end of the cylindrical wall of the drum interrupted by a plurality of notches where the spline grooves intersect the annular seat, supporting the drum on a platform with the outboard end of the drum opening upward, supporting the clutch pack in a sleeve above the annular seat, releasing the clutch pack for vertical descent toward the sleeve until the outside spline teeth on the bottom one of the reaction plates engage the annular seat, and vibrating the drum at high frequency and low amplitude to induce rotation of the clutch pack within the sleeve. As the clutch pack rotates, the outside spline teeth on succeeding bottom ones of the reaction plates traverse the annular seat until registering with the notches therein. Then, the reaction plates and the smaller friction plates descend in succession by gravity into the drum.

6 Claims, 3 Drawing Sheets

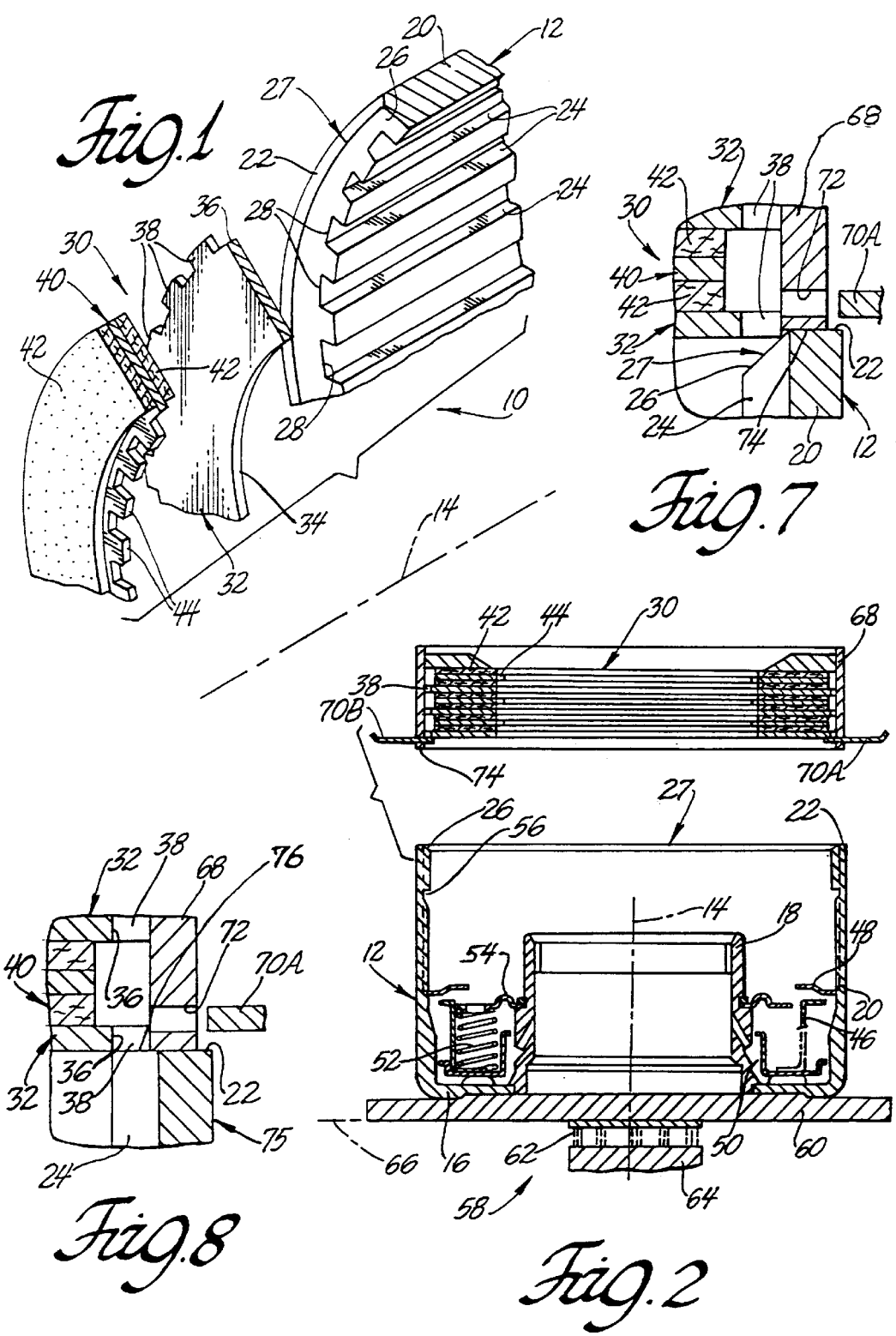

METHOD OF LOADING A CLUTCH PACK INTO A CLUTCH DRUM

TECHNICAL FIELD

This invention relates to a method of loading a pack of clutch plates into an outer clutch element of a clutch for a motor vehicle automatic transmission.

BACKGROUND OF THE INVENTION

A typical motor vehicle automatic transmission includes a plurality of clutches between planetary gear sets of the transmission which are turned on and off to vary the reduction ratio of the transmission. Each clutch commonly includes an outer clutch element often identified as a housing or "drum", an inner clutch element, a clutch pack, and a piston in the drum. The clutch pack includes a plurality of flat reaction plates rotatable with the drum and a plurality of friction plates stacked between the reaction plates and rotatable with the inner clutch element. When the clutch is off, the piston is retracted and the reaction plates and the drum are freely rotatable relative to the friction plates and the inner clutch element. When the clutch is on, the piston is thrust by hydraulic pressure against the clutch pack to squeeze together the reaction plates and the friction plates and thereby frictionally couple together the drum and the inner clutch element for unitary rotation. Commonly, the reaction plates have outside spline teeth which cooperate with spline grooves in a cylindrical wall of the drum in coupling the reaction plates to the drum for unitary rotation. Typically, the clutch pack is manually loaded into the drum by a person who drops the clutch pack vertically into the drum after rotating the reaction plates to align their outside spline teeth with the spline grooves in the drum. Manual loading of the clutch pack is especially the norm or the only method when clearances are inadequate for use of mechanical devices. Because the person manually loading the clutch pack can work comfortably with only a fraction of the reaction and friction plates constituting the complete clutch pack, the task of manually loading the complete clutch pack is slow and relatively uneconomical. Accordingly, manufacturers continue to seek improved methods of loading a clutch pack into an outer clutch element.

SUMMARY OF THE INVENTION

This invention is a new and improved method of loading a clutch pack into a drum or outer clutch element of a clutch for a motor vehicle automatic transmission. The clutch pack includes a plurality of friction plates between a plurality of reaction plates. Each reaction plate has a plurality of outside spline teeth slidably received in a corresponding plurality of straight spline grooves in a cylindrical wall of the drum. The method according to this invention of loading the clutch pack into the drum includes the steps of forming a seat on an outboard end of the cylindrical wall of the drum interrupted by a plurality of notches where the spline grooves intersect the seat, supporting the drum on a platform with the outboard end of the drum opening upward, supporting the clutch pack in a sleeve above the seat on the drum, releasing the clutch pack for vertical descent in the sleeve until the outside spline teeth on the bottom one of the reaction plates bear on the seat on the drum, and vibrating the drum perpendicular to the reaction plates at high frequency and low amplitude to induce rotation of the clutch pack on the seat within the sleeve. As the clutch pack rotates, the outside spline teeth on the bottom one of the reaction plates traverse the seat until attaining registry with the notches therein. Then, the reaction plates and the smaller friction plates therebetween descend in succession by gravity into the drum until the sleeve is empty and the drum is loaded. The seat on drum may be an inside chamfer or an annular flat wall on the cylindrical wall of the drum. The method according to this invention of loading a clutch pack into a drum proceeds more rapidly and efficiently than the prior manual method and is more ergonomically correct than the prior manual method.

BRIEF DESCRIPTION OF THE DRAWINGS

FIG. 1 is a fragmentary, exploded perspective view of a motor vehicle automatic transmission clutch including a clutch pack loaded into an outer clutch element of the clutch by the method according to this invention;

FIGS. 2–6 are schematic representations of a plurality of steps in the method according to this invention of loading a clutch pack into an outer clutch element;

FIG. 7 is an enlarged view of the portion of FIG. 4 identified by the reference circle 7 in FIG. 4, and FIG. 8 is similar to FIG. 7 illustrating the same step in the method according to this invention of loading the clutch pack into a modified outer clutch element.

DESCRIPTION OF THE PREFERRED EMBODIMENTS

Figure 3:
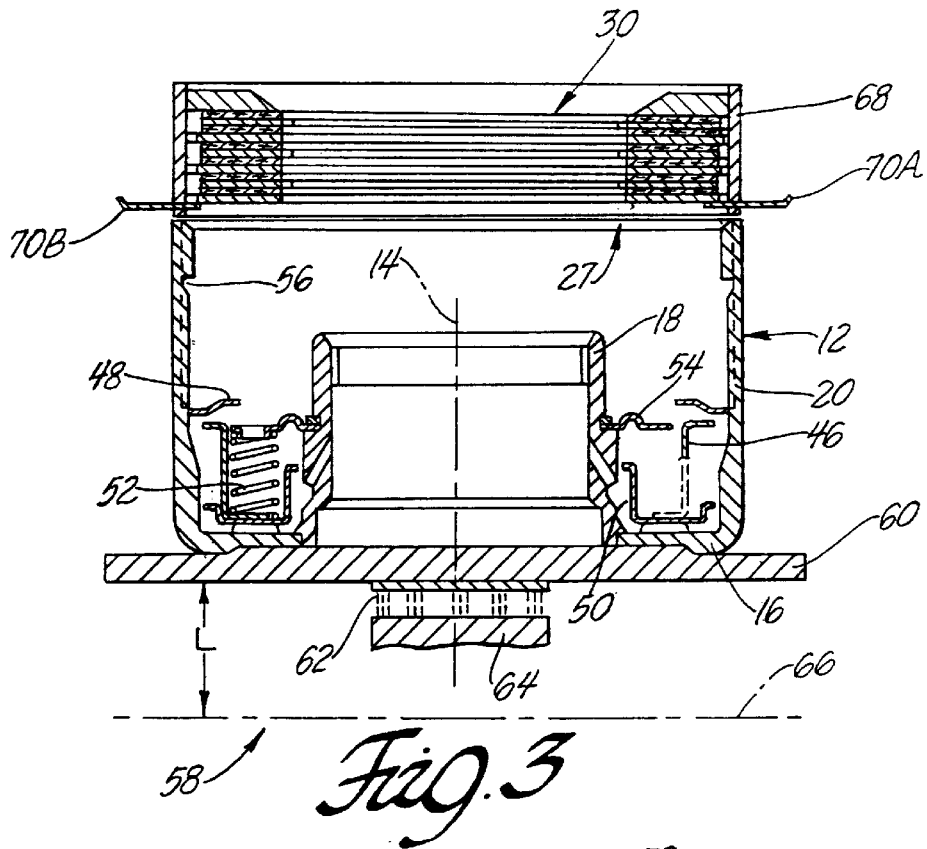

Referring to FIGS. 1–7, a fragmentarily illustrated clutch 10 for a motor vehicle automatic transmission includes an outer clutch element in the form of a bowl-shaped housing or drum 12. The drum 12 has a longitudinal centerline 14, an annular bottom 16, an inner cylindrical wall 18, and an outer cylindrical wall 20 which terminates at a flat annular end wall 22 constituting an open end of the drum. The outer cylindrical wall 20 is interrupted by a plurality of longitudinal spline grooves 24 parallel to and open toward the centerline 14 of the drum. The end wall 22 is interrupted by a conical inside chamfer 26 on the outer cylindrical wall 20 facing the centerline 14 of the drum and constituting an annular seat 27 on the outer cylindrical wall. The conical chamfer intersects the end wall 22 outboard of the root circle of the longitudinal spline grooves so that the annular seat 27 is interrupted by a plurality of rectangular notches 28, FIG. 1, where respective ones of the spline grooves 24 intersect the seat.

A clutch pack 30 of the clutch 10 includes a plurality of annular, flat reaction plates 32 each having an inside diameter 34 exceeding the diameter of the inner cylindrical wall 18 of the drum, an outside diameter 36 slightly less than the diameter of the outer cylindrical wall 20 of the drum, and a plurality of outside spline teeth 38 protruding radially beyond the outside diameter 36. The spline teeth 38 seat in and cooperate with respective ones of the spline grooves 24 in coupling the reaction plates to the drum for unitary rotation about the centerline 14. A plurality of smaller flat friction plates 40 are interposed between the reaction plates 32. Each friction plate 40 has a friction liner 42 thereon and a plurality of inside spline teeth 44 through which the friction plates are coupled to an inner clutch element, not shown, of the clutch 10 rotatable relative to the drum about an axis of rotation coincident with the centerline 14 of the drum.

An annular piston 46 of the clutch and an anti-rattle spring 48 are disposed in the drum 12 behind the clutch pack 30. The piston 46 cooperates with the bottom 16 and with the inner and outer cylindrical walls 18,20 of the drum in defining a working chamber 50 and is biased toward the bottom of the drum by a plurality of springs 52 trapped between the piston and a retainer plate 54 on the inner cylindrical wall of the drum. A flange of the piston 46 outside of the retainer plate 54 engages and squeezes the clutch pack 30 against a retaining ring, not shown, in a groove 56 in the outer cylindrical wall of the drum when the clutch is turned on by entry of hydraulic fluid at elevated pressure into the working chamber 50. When the clutch pack 30 is squeezed between the piston and the retaining ring, the friction plates 40 and the reaction plates 32 are squeezed together and cooperate in frictionally coupling the drum and the inner clutch element for unitary rotation. When the clutch is turned off by exhausting the working chamber 50 of hydraulic fluid, the springs 52 separate the piston 46 from the clutch pack to release the drum and the reaction plates for rotation independent of the inner clutch element and the friction plates.

The method according to this invention by which the clutch pack 30 is automatically loaded into the drum 12 at a schematically illustrated work station 58, FIGS. 2–6, is now described. The work station 58 includes a platform 60, a vibratory device 62 connected to the platform, an elevating device 64 operable to raise the platform and the vibratory device through a lift stroke "L", FIGS. 3–5, from a base or starting elevation 66 and a right cylindrical sleeve 68 above the platform. The circumference of the sleeve 68 closely matches the circumference of the reaction plates 32 around the outside spline teeth 38 thereon. A pair of flat gates 70A,70B are supported in respective ones of a pair of slots 72 in the sleeve 68 near a bottom end 74 thereof for lateral translation between closed positions, FIGS. 2,3 and 6, obstructing the sleeve and open positions, FIGS. 4,5 and 7, removed from the sleeve.

The drum 12, wit the piston 46 and the anti-rattle spring 48 already installed therein, is positioned on the platform 60 by conventional means, not shown, with the outer cylindrical wall 20 of the drum opening upward below and in alignment wit the sleeve 68. The complete clutch pack 30, i.e. all of the friction and reaction plates which constitute the clutch pack is loaded mechanically or manually into the sleeve with the gates 70A,70B closed so tat the clutch pack is retained against gravity in the sleeve above the drum, FIGS. 2–3. Importantly, the clutch pack is loaded into the sleeve without regard to the angular orientation of the reaction plates, thereby eliminating the slow and labor intensive step characteristic of the prior art method of rotating the reaction plates for proper orientation of their outside spline teeth relative to the drum.

Figure 4:
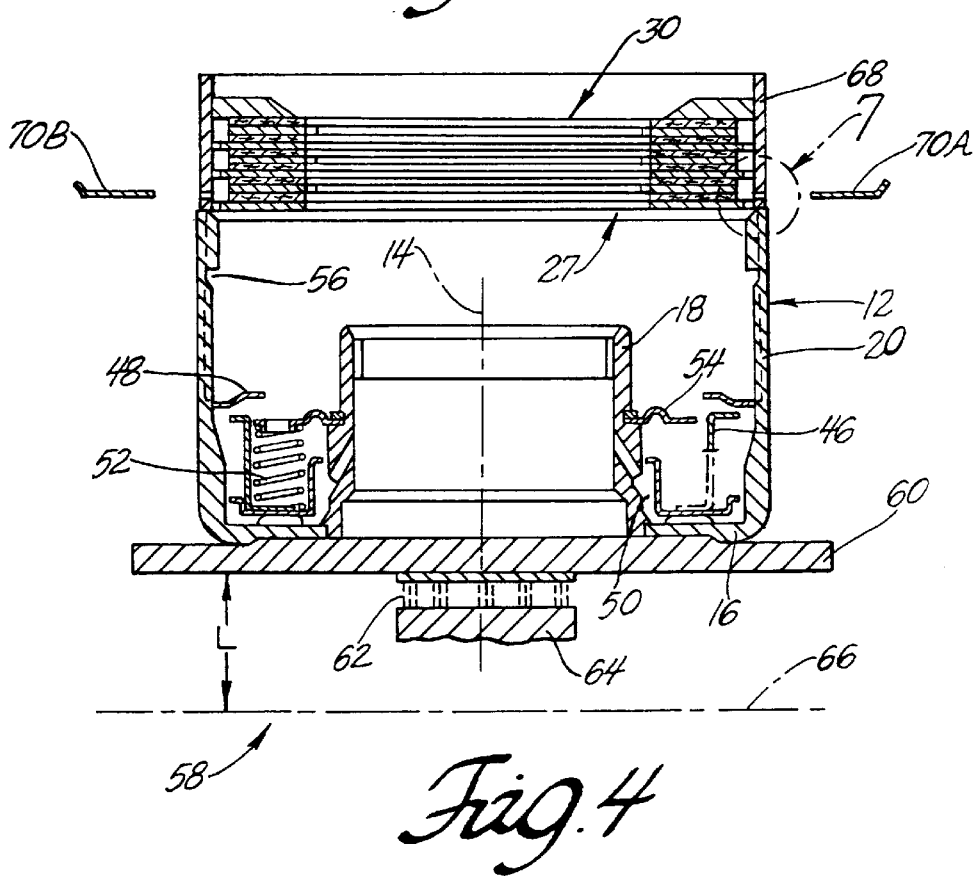
Figure 5:
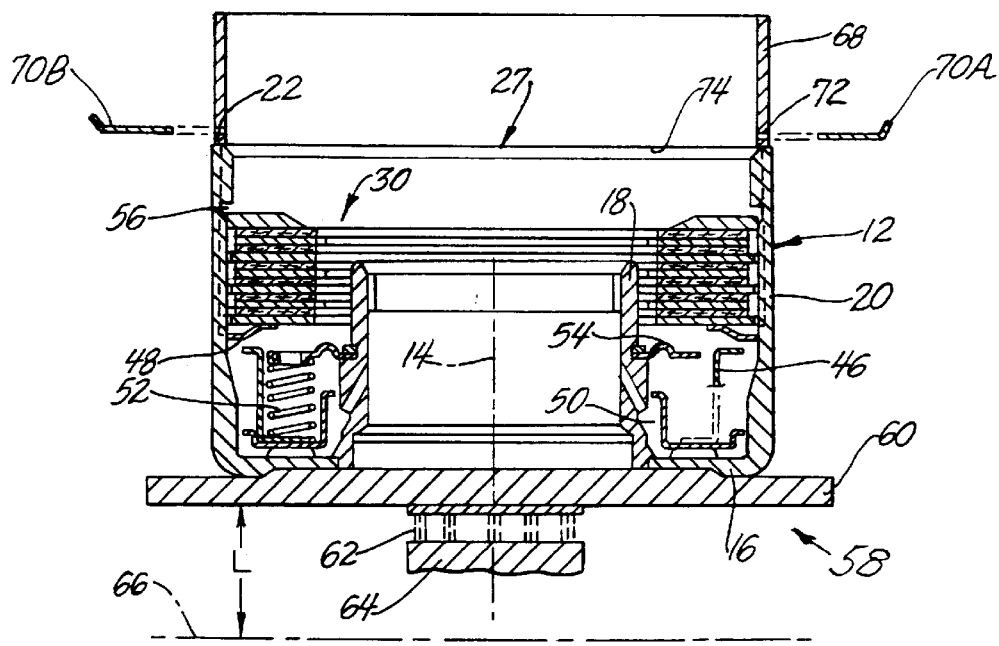

The elevating device 64 then raises the platform 60 through the lift stroke "L" to a raised position, FIGS. 3–5, characterized by engagement of the end wall 22 on the drum against the bottom end 74 of the sleeve 68, FIGS. 3–4. The close fit of the reaction plates 32 in the sleeve 68 assures that clutch pack is directly above the seat 27 on the drum. When the gates 70A,70B are then actuated from closed to open, FIGS. 4 and 7, the clutch pack 30 descends in the sleeve 68 by gravity until the outside spline teeth 38 on the bottom one of the reaction plates 32 in the clutch pack engage the seat 27, FIG. 7. The clutch pack 30 is thus supported on the seat while still confined within the sleeve and with the reaction plates and the friction plates therebetween in parallel planes substantially perpendicular to the spline grooves 24 in the cylindrical wall of the drum.

The vibratory device 62 is then actuated to induce high frequency, low amplitude vibration of the drum 12 in the direction of the longitudinal centerline 14 of the drum. The characterizing result of such high frequency, low amplitude vibration of the drum is that the clutch pack rotates about the centerline 14 of the drum within the sleeve 68 with no overt separation between the reaction plates and the friction plates nor between the clutch pack and the seat 27. As the clutch pack rotates, the outside spline teeth on the bottom one of the reaction plates of the clutch pack traverse the seat 27 toward the nearest ones of the notches 28. The sleeve 68 prevents lateral translation of the reaction plates as the clutch pack rotates to maintain the reaction plates directly above the seat 27.

When the outside spline teeth 38 on the bottom one of the reaction plates of the clutch pack attain registry with the rectangular notches 28, the bottom reaction plate and the adjacent smaller friction plate 40 descend by gravity into the annulus between the inner and the outer cylindrical walls 18,20 of the drain until becoming seated on the and-rattle spring 48 above the piston 46. Because the friction plate is smaller than the reaction plate it descends easily into the drum even though it may be slightly eccentric relative to the outer cylindrical wall. With continued high frequency, low amplitude vibration of the drum, succeeding bottom ones of the reaction plates bear against and rotate relative to the seat 27 until their outside spike teeth attain registry with the notches 28. The reaction plates and adjacent smaller friction plates then descend in sequence into the annulus between the inner and outer cylindrical walls of the drum until the sleeve 68 is empty and clutch pack 30 is fully loaded into the drum, FIG. 5.

Figure 6:
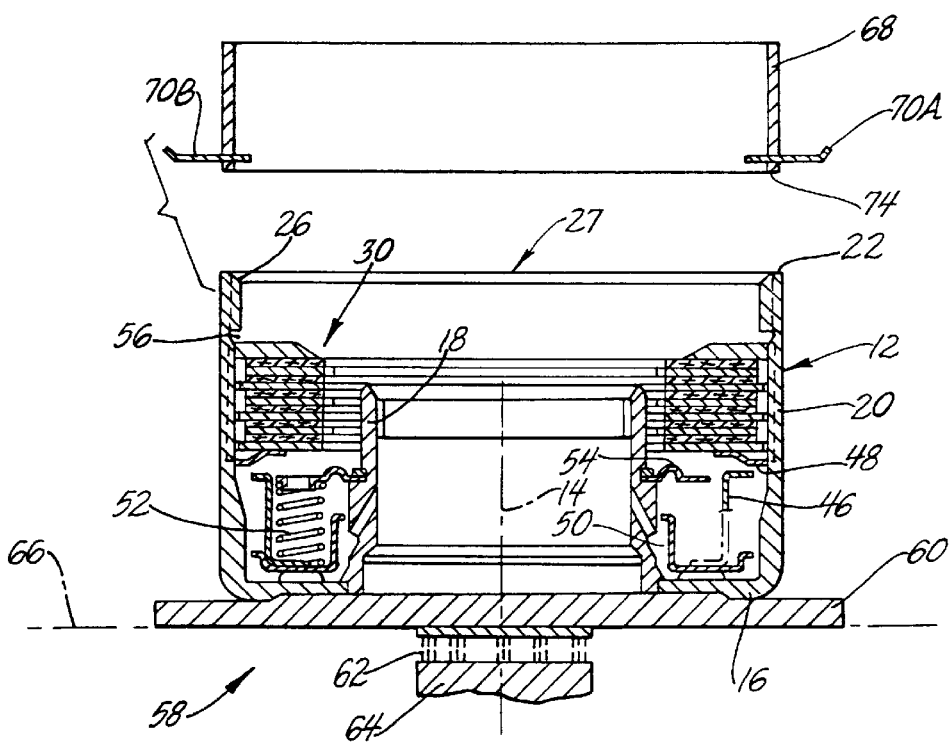

After the clutch pack is fully loaded into the drum, vibration of the drum is terminated and the elevating device 64 lowers the platform 60 through the lift stroke "L" back to the base elevation 66, FIG. 6, at which the drum is separated from the sleeve by a span suitable for removal of the drum from the work station 58. Concurrently, the gates 70A,70B are closed and a new clutch pack is dispensed into the sleeve in preparation for being loaded by the method according to this invention into another drum 12 on the platform 60.

Referring to FIG. 8, the clutch pack 30 is loaded by the method according to this invention into a modified outer clutch element or drum 75. The modified drum 75 is identical to the drum 12 described above except that the seat 27 constituted by the inside chamfer 26 on the outer cylindrical wall 20 is eliminated. Instead, the end wall 22 is flat across substantially the full thickness of the outer cylindrical wall 20 of the drum except for the notches 28 where the spline grooves 24 intersect the end wall so that the end wall itself constitutes an annular seat 76 on the drum. When the gates 70A,70B are actuated from closed to open, the clutch pack 30 descends in the sleeve 68 by gravity until the outside spline teeth 38 on the bottom one of the reaction plates 32 in the clutch pack engage the seat 76. The clutch pack 30 is thus supported on the seat 76 on the end wall 22 while still confined within the sleeve.

The vibratory device 62 is then actuated to induce high frequency, low amplitude vibration of the drum 12 in the direction of its longitudinal centerline and rotation of the clutch pack about the centerline 14 of the drum within the sleeve 68. As the clutch pack rotates, the outside spline teeth on the bottom one of the reaction plates of the clutch pack traverse the seat 76 toward the nearest ones of the notches 28 therein. When the outside spline teeth 38 on succeeding ones of the reaction plates attain registry with the rectangular notches 28 in the seat 76, the reaction plates and the adjacent smaller friction plates 40 descend as described above by gravity into the drum until the sleeve is empty.

While only two preferred embodiments of this invention have been described herein, it will be appreciated that other forms could be readily adapted by one skilled in the art. Accordingly, the scope of this invention is to be considered limited only by the following claims.

The embodiments of the invention in which an exclusive property or privilege is claimed are defined as follows:

1. A method of loading a clutch pack into a bowl-shaped drum of a clutch for a motor vehicle transmission, the drum including a cylindrical wall having an open end and a plurality of longitudinal spline grooves in the cylindrical wall facing a longitudinal centerline of the drum, and the clutch pack including a plurality of flat reaction plates each having a plurality of outside spline teeth thereon adapted for reception in respective ones of the longitudinal spline grooves and a plurality smaller flat friction plates stacked between the reaction plates, comprising the steps of:

forming an annular seat on the cylindrical wall of the drum at the open end thereof interrupted by respective ones of a plurality of notches where respective ones of the longitudinal spline grooves in the cylindrical wall intersect the annular seat, supporting the drum with the open end of the cylindrical wall facing upward, stacking the clutch pack above the open end of the cylindrical wall in alignment with the annular seat and without regard to the angular orientation of the reaction plates relative to the spline grooves in the cylindrical wall of the drum, lowering the clutch pack by gravity toward the drum until the outside spline teeth on the bottom one of the plurality of reaction plates in the clutch pack engage the annular seat so that the clutch pack is supported on the annular seat with the plurality of reaction plates and the plurality of friction plates in parallel planes substantially perpendicular to the longitudinal centerline of the drum, and vibrating the drum at high frequency and low amplitude in the direction of the longitudinal centerline of the drum to induce rotation of the clutch pack on the annular seat while at the same time preventing lateral translation of the plurality of reaction plates and the plurality of friction plates so that the plurality of reaction plates and the plurality of friction plates descend by gravity and in succession into the drum as the outside spline teeth on succeeding bottom ones of the plurality of reaction plates attain registry with the notches in the annular seat.

2. The method recited in claim 1 of loading a clutch pack into a bowl-shaped drum of a clutch wherein the step of forming an annular seat on the cylindrical wall of the drum at the open end thereof comprises the steps of:

forming a flat annular end wall on the cylindrical wall of the drum at the open end thereof in a plane perpendicular to the longitudinal centerline of the drum, and forming a conical chamfer on the cylindrical wall of the drum at the open end thereof facing the longitudinal centerline of the drum and interrupting the flat annular end wall outboard of the root circle of the plurality of spline grooves so that the conical chamfer is interrupted by a plurality of rectangular notches where respective ones of the spline grooves intersect the conical chamfer.

3. The method recited in claim 1 of loading a clutch pack into a bowl-shaped drum of a clutch wherein the step of forming an annular seat on the cylindrical wall of the drum at the open end thereof comprises the step of:

forming a flat annular end wall on the cylindrical wall of the drum at the open end thereof in a plane perpendicular to the longitudinal centerline of the drum and extending across the complete thickness of the cylindrical wall so that the flat annular end wall is interrupted by a plurality of rectangular notches where respective ones of the spline grooves intersect the flat annular end wall.

4. The method recited in claim 2 or in claim 3 of loading a clutch pack into a bowl-shaped drum of a clutch wherein the step of stacking the clutch pack above the open end of the cylindrical wall in alignment with the annular seat comprises the steps of:

forming a right cylindrical sleeve having a circumference calculated to closely surround the outside spline teeth on the plurality of reaction plates, locating the right cylindrical sleeve above the open end of the drum in alignment with the annular seat, supporting a gate on the sleeve for translation between a closed position obstructing the sleeve and an open position in which the sleeve is unobstructed, and depositing the clutch pack into the sleeve with the gate in its closed position without regard to the angular orientation of the plurality of reaction plates relative to the spline grooves so that the clutch pack is supported in the sleeve above the open end of the cylindrical wall of the drum in alignment with the annular seat.

5. The method recited in claim 4 of loading a clutch pack into a bowl-shaped drum of a clutch wherein the step of lowering the clutch pack into the drum comprises the steps of:

positioning the open end of the cylindrical wall of the drum substantially immediately below the right cylindrical sleeve with the clutch pack therein, and translating the gate from the closed position thereof to the open position thereof to permit the clutch pack to descend by gravity toward the clutch drum until the outside spline teeth on the bottom one of the plurality of reaction plates in the clutch pack engage the annular seat so that the clutch pack is supported on the annular seat and concurrently confined within the right cylindrical sleeve.

6. The method recited in claim 5 of loading a clutch pack into a bowl-shaped drum of a clutch wherein the step of vibrating the drum comprises the steps of:

supporting the drum on a platform, and vibrating the platform at high frequency and low amplitude in the direction of the longitudinal centerline of the drum with the clutch pack confined within the right cylindrical sleeve so that the clutch pack rotates on the annular seat within the right cylindrical sleeve about the longitudinal centerline of the drum without overt separation between the reaction plates and the friction plates and without overt separation between the clutch pack and the annular seat.

* * * * *